US012050749B2

(12) United States Patent
McKenney et al.

(10) Patent No.: US 12,050,749 B2
(45) Date of Patent: Jul. 30, 2024

(54) SMART REJECTION OF FALSE SOLID-STATE BUTTON PRESSES ON SMART GLASSES

(71) Applicant: Meta Platforms Technologies, LLC, Menlo Park, CA (US)

(72) Inventors: Kai Tashima McKenney, San Mateo, CA (US); Igor Markovsky, Campbell, CA (US); Kevin Jun Suk Choi, San Jose, CA (US); Francisco Xavier Suarez, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/052,717

(22) Filed: Nov. 4, 2022

(65) Prior Publication Data

US 2023/0185406 A1 Jun. 15, 2023

Related U.S. Application Data

(60) Provisional application No. 63/287,944, filed on Dec. 9, 2021.

(51) Int. Cl.
*G06F 3/041* (2006.01)
*G06F 3/01* (2006.01)
(Continued)

(52) U.S. Cl.
CPC ............ *G06F 3/0418* (2013.01); *G06F 3/011* (2013.01); *G06F 3/012* (2013.01); *G06F 3/014* (2013.01);
(Continued)

(58) Field of Classification Search
CPC .... G06F 3/0418; G06F 3/012; G06F 3/03547; G06F 3/044; G06F 3/011; G06F 3/013;
(Continued)

(56) References Cited

U.S. PATENT DOCUMENTS

2011/0080289 A1\* 4/2011 Minton ................. H04B 1/385
704/E17.001
2013/0335321 A1\* 12/2013 Sugita .................. G06F 3/0488
345/157
(Continued)

FOREIGN PATENT DOCUMENTS

EP 2674850 A2 12/2013
EP 3901688 A2 10/2021

OTHER PUBLICATIONS

EPO—International Search Report and Written Opinion for International Application No. PCT/US2022/052195, mailed Mar. 16, 2023, 13 pages.

*Primary Examiner* — Darlene M Ritchie
(74) *Attorney, Agent, or Firm* — McDermott Will & Emery LLP

(57) ABSTRACT

A method, for detecting a press button action in a headset and assessing the user intention thereof is provided. The method includes receiving a force data from a force sensor in a headset, a capacitive data from a capacitive sensor in the headset, an inertial data from an inertial sensor in the headset, and a location data from a face sensor in the headset; combining the force data, the capacitive data, the inertial data, and the location data to assess a user intention; and determining whether to accept or reject a button press action on the headset based on the user intention. A headset including a memory storing instructions to cause a processor to cause the headset to perform the above method are also provided.

18 Claims, 4 Drawing Sheets

(51) Int. Cl.
*G06F 3/0346* (2013.01)
*G06F 3/0354* (2013.01)
*G06F 3/044* (2006.01)

(52) U.S. Cl.
CPC ........ *G06F 3/0346* (2013.01); *G06F 3/03547* (2013.01); *G06F 3/044* (2013.01); *G06F 2203/04105* (2013.01)

(58) Field of Classification Search
CPC ........ G06F 3/014; G06F 3/017; G06F 3/0346; G06F 2203/04105
See application file for complete search history.

(56) References Cited

U.S. PATENT DOCUMENTS

| | | | |
|---|---|---|---|
| 2016/0162031 A1* | 6/2016 | Westerman | G06F 3/04847 345/173 |
| 2016/0180602 A1* | 6/2016 | Fuchs | G06F 3/012 463/31 |
| 2019/0070506 A1* | 3/2019 | Stafford | A63F 13/26 |
| 2022/0345677 A1* | 10/2022 | Shuster | G06T 19/006 |
| 2023/0266827 A1* | 8/2023 | Dahlgren | G06F 3/0488 345/173 |

\* cited by examiner

SMART REJECTION OF FALSE SOLID-STATE BUTTON PRESSES ON SMART GLASSES

CROSS-REFERENCE TO RELATED APPLICATIONS

The present disclosure is related and claims priority under 35 U.S.C. § 119(e) to U.S. Provisional Application No. 63/287,944, to Kai T. McKernney et al., entitled SMART REJECTION OF FALSE SOLID STATE BUTTON PRESSES ON SMART GLASSES, filed on Dec. 9, 2021, the contents of which are hereby incorporated by reference in their entirety, for all purposes.

BACKGROUND

Field

The present disclosure is related generally to the control and assessment of user inputs in smart glasses for mixed reality applications. More specifically, the present disclosure is related to multiple sensors and methods to assess a user intention when a button in a smart glass for mixed reality applications is pressed.

Related Art

Smart glasses for mixed reality applications include multiple buttons and active points that work as a user interface to receive inputs from the user. However, when a user unintentionally presses a button in the headset, it is highly inconvenient for the user to trigger an undesired action in the headset, causing the user to scramble for undoing the undesirable changes in settings, configuration, and the like.

SUMMARY

In a first embodiment, a computer-implemented method includes receiving a force data from a force sensor in a headset, a capacitive data from a capacitive sensor in the headset, an inertial data from an inertial sensor in the headset, and a location data from a face sensor in the headset, combining the force data, the capacitive data, the inertial data, and the location data to assess a user intention, and determining whether to accept or reject a button press action on the headset based on the user intention.

In a second embodiment, a system includes one or more processors and a memory configured to store instructions. When the instructions are executed by the one or more processors, they cause the system to receive a force data from a force sensor in a headset, a capacitive data from a capacitive sensor in the headset, an inertial data from an inertial sensor in the headset, and a location data from a face sensor in the headset, to combine the force data, the capacitive data, the inertial data, and the location data to assess a user intention, and to determine whether to accept or reject a button press action of the headset based on the user intention.

In a third embodiment, a computer-implemented method includes receiving a force data, a capacitive data, an inertial data, and a location data from a headset, correlating at least two of the force data, the capacitive data, and the inertial data to find a resonance event, identifying a user intention for the headset based on the resonance event, and determining whether to accept or reject a button press action of the headset, based on the user intention.

In a fourth embodiment, a system includes a first means to store instructions, and a second means to execute the instructions to cause the system to perform a method. The method includes receiving a force data from a force sensor in a headset, a capacitive data from a capacitive sensor in the headset, an inertial data from an inertial sensor in the headset, and a location data from a face sensor in the headset, combining the force data, the capacitive data, the inertial data, and the location data to assess a user intention, and determining whether to accept or reject a button press action on the headset based on the user intention.

In a further embodiment, a non-transitory, computer-readable memory stores instructions, which when executed by one or more processors, cause a computer to perform a method. The method includes receiving a force data from a force sensor in a headset, a capacitive data from a capacitive sensor in the headset, an inertial data from an inertial sensor in the headset, and a location data from a face sensor in the headset, combining the force data, the capacitive data, the inertial data, and the location data to assess a user intention, and determining whether to accept or reject a button press action on the headset based on the user intention.

These and other embodiments will be clear from the present disclosure.

BRIEF DESCRIPTION OF THE DRAWINGS

In the figures, elements having the same or similar reference numerals are associated with the same or similar attributes and features, unless explicitly stated otherwise.

DETAILED DESCRIPTION

Figure 1:
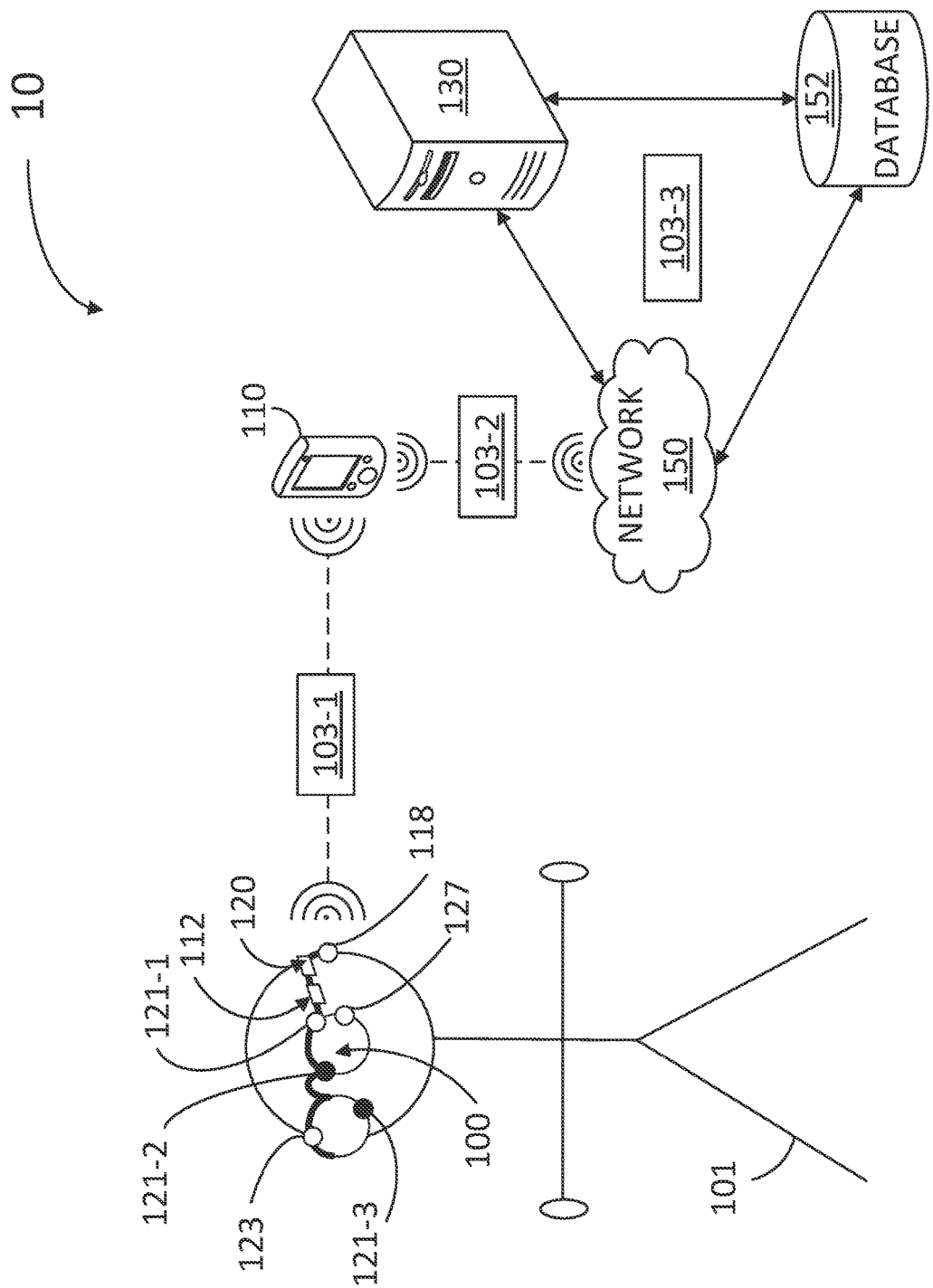
FIG. 1 illustrates a network architecture including a headset running an immersive reality application hosted by a remote server, according to some embodiments.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the included claims. Various aspects of the subject technology will now be disclosed according to particular but non-limiting examples. Various embodiments described in the present disclosure may be carried out in different ways and variations, and in accordance with a desired application or implementation.

In the following detailed description, numerous specific details are set forth to provide a full understanding of the present disclosure. It will be apparent, however, to one ordinarily skilled in the art, that embodiments of the present disclosure may be practiced without some of the specific details. In other instances, well-known structures and techniques have not been shown in detail so as not to obscure the disclosure.

The subject technology is illustrated, for example, according to various aspects described below. Various examples of aspects of the subject technology are described as numbered claims (claim 1, 2, etc.) for convenience. These are provided as examples, and do not limit the subject technology.

General Remarks

In order to enable a reliable solid-state button (e.g., no physical tact switch), it is necessary to distinguish an intentional button press from many other signals/phenomena that may appear to a single sensor to be a button press. The primary force sensor might interpret a flex of the smart glasses arm as the user adjusts the frames on their face as a button press. Also, just a capacitive touch sensor might interpret wet hair or a passing finger as a button press.

Aspects of the present disclosure are directed to methods of combining information from various sensors to narrow the definition of a successful solid state button press to just a press of a certain force directly on the button feature on the smart glasses, and reject all other presses, flexes, and other phenomena in the area and nearby.

According to aspects, a smart glass will combine information from a series of sensors (e.g., strain gauge/force sensor, capacitive touch, inertial measurement unit (IMU), capacitive face detection) to precisely accept and reject action button presses.

According to aspects, strain gauge/force sensors may define a certain amount of force that may be applied at the button location, helping reject light inputs like passing fingers and hair.

According to aspects, a capacitive touch area directly underneath the button feature may ensure that there is a finger on the button feature, and rejects other arm flexures or presses near the button feature that might still exert the necessary force on the force sensor.

According to aspects, an IMU helps to correlate an intentional button press with the expected motion of the glasses when the user presses the button, to reject other accidental presses.

According to aspects, a capacitive face detection sensor helps determine if the glasses are on the user's face or not, and therefore prevents button presses when the user handles the glasses in their hands (and not on their face).

Exemplary scenarios include:

A user reaches up and presses/squeezes the button area with a finger. The system detects this as a successful button press and reacts accordingly.

A user adjusts the glasses on their face—this results in force on the glasses near (but not directly on) the button area. A force sensor detects this as a button press, but the capacitive touch signal is not indicative of a finger directly on the button feature, and therefore the event is not detected as a button press.

User collides with another person while playing a sport. The other person's arm or hand contacts the user's smart glasses during the collision. This happens to result in signals at the force sensor and capacitive touch sensor that resemble a button press. The IMU sees activity not representative of a normal button press, and therefore the event is not detected as a button press.

User squeezes the button area while holding the glasses in their hands and preparing to don the glasses. Signals at the force sensor (e.g., force sensor pre-senses), touch sensor, and IMU resemble a normal button press. The face detection sensor (e.g., face detection/on-head detection sensor) detects that the glasses are not currently on the user's face, and therefore the event is not detected as a button press.

Exemplary Network Architecture

FIG. 1 illustrates an architecture 10 including a user 101 wearing a headset 100 (e.g., a smart glass or a VR/AR visor) coupled with a mobile device 110, a remote server 130, and a database 152 via a network 150, according to some embodiments. Mobile device 110 may be a smart phone, and may communicate with smart glass 100 via wireless communications to exchange a first dataset 103-1. In some embodiments, mobile device 110 may belong to user 101 as well. Dataset 103-1 may include a recorded video, audio, or some other file or streaming media. Mobile device 110 may be communicatively coupled with remote server 130 and database 152 via network 150, and transmit/share information, files, and the like with one another (e.g., dataset 103-2 and dataset 103-3). Headset 100 may include a button 127 configured to receive an input from user 101 (e.g., via a press action with a finger).

In some embodiments, headset 100 may include multiple sensors 121-1, 121-2, and 121-3 (hereinafter, collectively referred to as "sensors 121"). Sensors 121 may include inertial measurement units (IMUs), gyroscopes, microphones, cameras, and the like, mounted within the frame of headset 100. Other sensors 121 that can be included in headset 100 may include magnetometers, contact microphones, optical devices such as photodiodes and cameras, touch sensors, pressure sensors, force sensors and other electromagnetic devices such as capacitive sensors, a pressure sensor, and the like. Sensors 121 may include a face sensor 121-3, which may be a capacitive sensor disposed on the frame of headset 100 such that its signal is indicative of a location of headset 100 (e.g., resting on the face of user 101, or away from it). Sensors 121 may also include an acoustic microphone and/or a contact microphone. Acoustic microphones receive acoustic signals propagating through the air, as pressure waves. Contact microphones may be mechanically coupled to the skin and a bone of the user, e.g., in a nose pad or in an arm of headset 100, in contact with the user's temple, and the like. Dataset 103-1 may include force data, capacitive data, inertial data, and location data transmitted from headset 100 to mobile device 110 and/or remote server 130 for processing.

In addition, headset 100 or mobile device 110 may include a memory circuit 120 storing instructions, and a processor circuit 112 configured to execute the instructions to cause headset 100 to perform, at least partially, some of the steps in methods consistent with the present disclosure. In some embodiments, memory circuit 120 may include instructions for executing an immersive reality application hosted by remote server 130. Accordingly, either processor 112 in headset 100, or one or more processors in mobile device 110, or in remote server 130 may use the force data, the capacitive data, the inertial data, and the location data to assess a user intention for pressing button 127 in headset 100.

The input from user 101 upon pressing button 127 may be associated with a specific action in headset 100 such as "wake-up," or "turn camera on/off" (e.g., a camera 123 mounted on headset 100). In some embodiments, the input from user 101 may include an action within the immersive application running in headset 100.

In some embodiments, headset 100 may further include a communications module 118 enabling the device to wirelessly communicate with mobile device 110, with remote server 130, and/or database 152 via network 150. In some embodiments, communications module 118 can include, for example, radio-frequency hardware (e.g., antennas, filters, analog to digital converters, and the like) and software (e.g., signal processing software). Headset 100 may thus download a multimedia online content (e.g., dataset 103-1) from remote server 130, to perform at least partially some of the operations in methods as disclosed herein. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Figure 2:
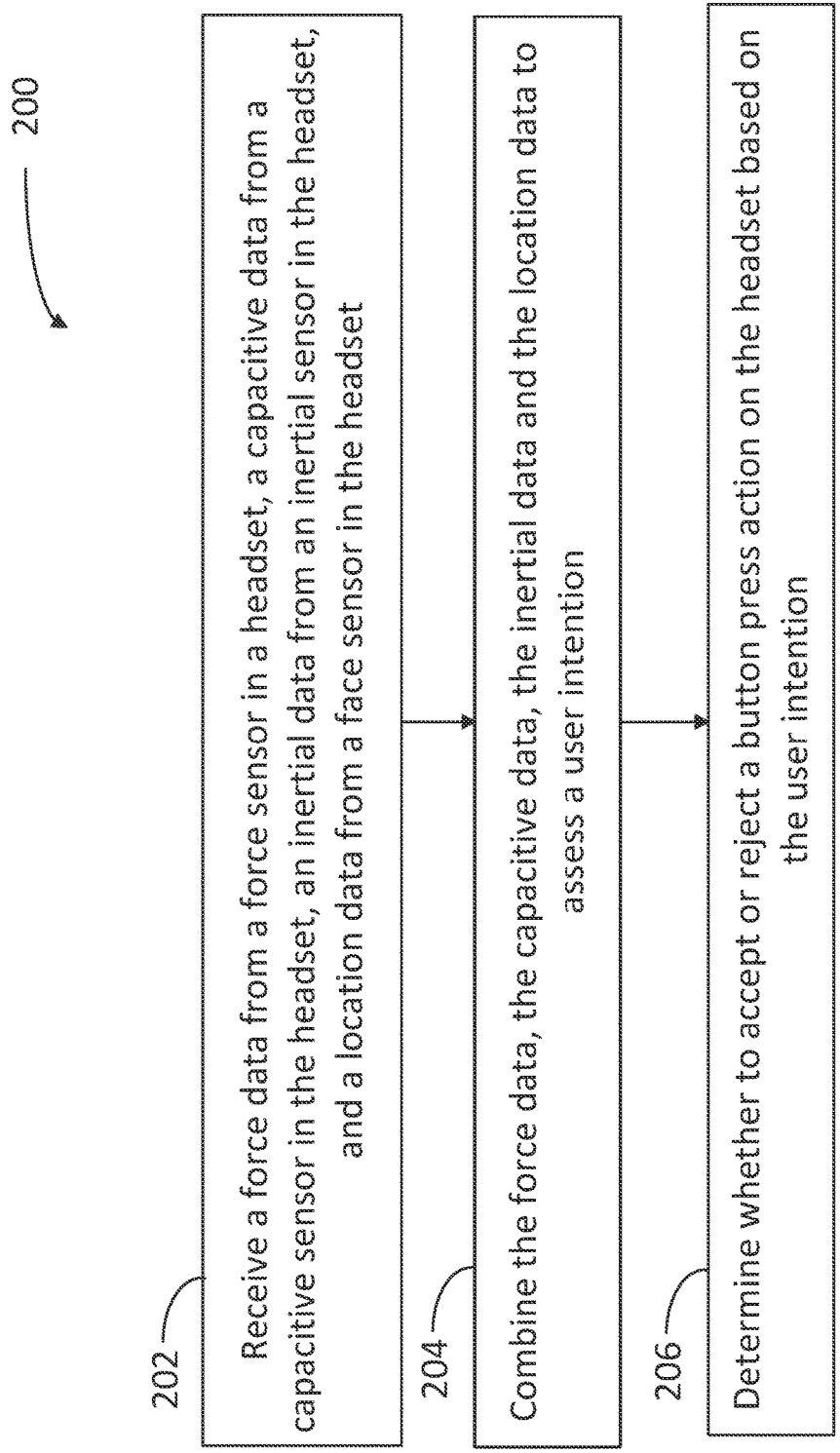
FIG. 2 is a flow chart illustrating steps in a method for accepting or rejecting a button press in a headset running an immersive reality application, according to some embodiments.

FIG. 2 is a flow chart illustrating steps in a method 200 for accepting or rejecting a button press in a headset running an immersive reality application, according to some embodiments. In some embodiments, method 200 may be performed at least partially within a headset, a mobile device, or a remote server, as disclosed herein (cf. headset 100, mobile device 110, and remote server 130). Accordingly, at least one or more steps in method 200 may be performed by a processing circuit or a communications module executing instructions stored in a memory circuit, as disclosed herein (cf., processing circuit 112, memory circuit 120, and communications module 118). Moreover, in some embodiments, method 200 may include collecting, receiving, and transmitting sensor data from either one of a force sensor, a capacitive sensor, an inertial sensor, or a facial sensor in the headset (e.g., sensors 121). In some embodiments, a method consistent with the present disclosure may include any one of the steps in method 200 performed in a different order, simultaneously, quasi-simultaneously, or overlapping in time.

Step 202 includes receiving a force data from a force sensor in a headset, a capacitive data from a capacitive sensor in the headset, an inertial data from an inertial sensor in the headset, and a location data from a face sensor in the headset.

Step 204 includes combining the force data, the capacitive data, the inertial data, and the location data to assess a user intention. In some embodiments, the capacitive data is indicative of a presence of a user finger, the force data is indicative of a button press action, and step 204 may include assessing that the user intention is to perform the button press action. In some embodiments, the inertial data is indicative of a movement of the headset consistent with the button press action, the force data is indicative of a button press action, and step 204 includes assessing that the user intention is to perform the button press action. In some embodiments, the face sensor is a capacitive sensor and the location data is indicative of a presence of the headset on a user face, and step 204 includes assessing that the user intention is to perform the button press action. In some embodiments, the force data and the capacitive data are indicative of a button press action, the inertial data is indicative of an involuntary collision of a user with an obstacle, and step 204 includes assessing that the user intention is not to perform the button press action.

Step 206 includes determining whether to accept or reject a button press action on the headset based on the user intention. In some embodiments, the headset is configured to run an immersive reality application hosted by a remote server, and step 206 includes performing an action in the immersive reality application when the button press action is accepted, stopping the immersive reality application when the location data is indicative that the headset is not on a user's face, or stopping the immersive reality application when the inertial data indicates a free-fall of the headset. In some embodiments, the force sensor is a strain gage, and step 206 includes identifying the force data as a passing finger or a hair touch, and discarding the force data to assess a user intention. In some embodiments, step 206 includes assessing that the user intention is not to perform the button press action when the location data is indicative that the headset is not in contact with a user's face.

Figure 3:
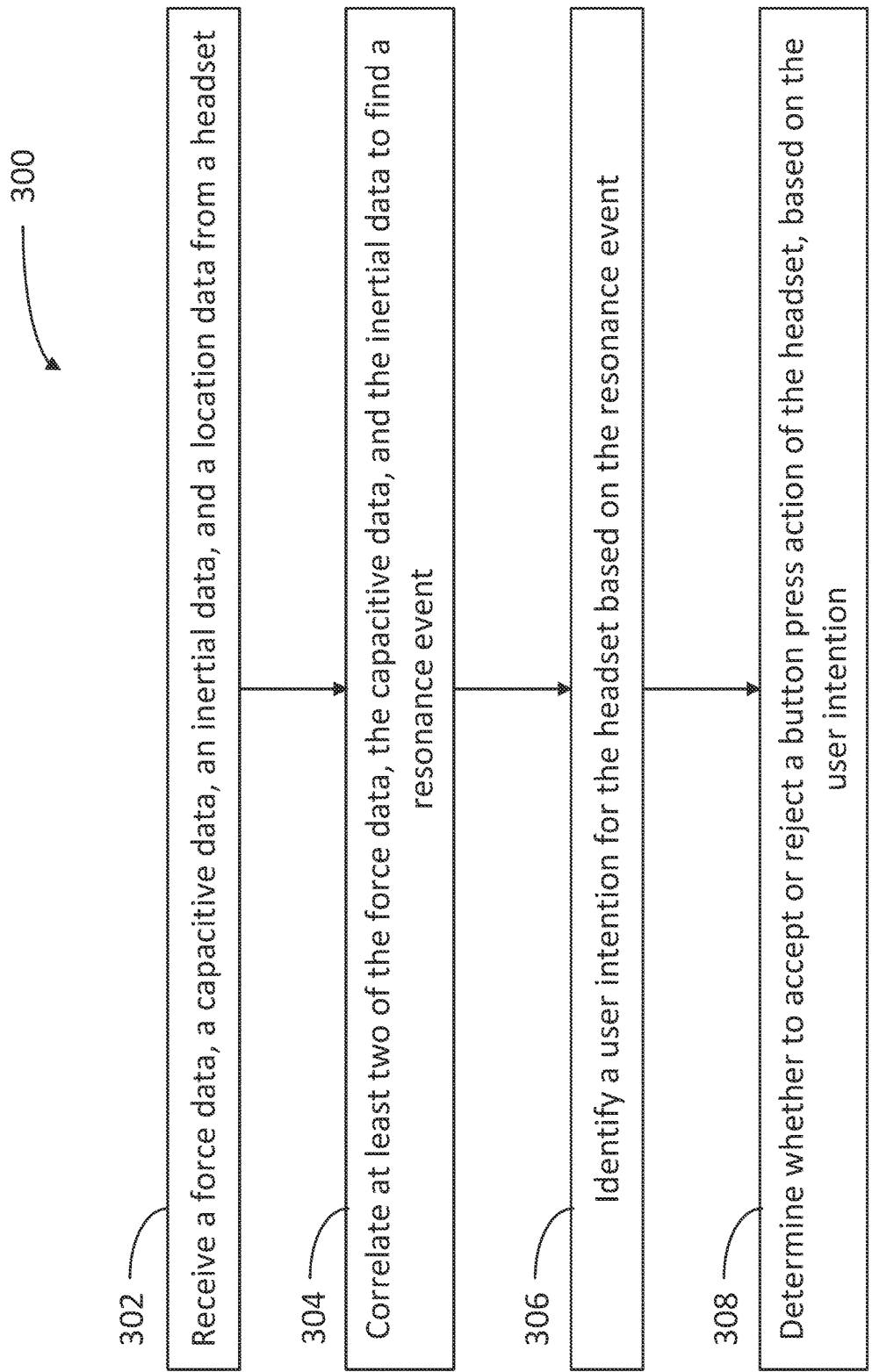
FIG. 3 is a flow chart illustrating steps in a method for assessing a user intention to accept a button press in a headset running an immersive reality application, according to some embodiments.

FIG. 3 is a flow chart illustrating steps in a method 300 for assessing a user intention to accept a button press in a headset running an immersive reality application, according to some embodiments. In some embodiments, method 300 may be performed at least partially within a headset, a mobile device, or a remote server, as disclosed herein (cf. headset 100, mobile device 110, and remote server 130). Accordingly, at least one or more steps in method 300 may be performed by a processing circuit or a communications module executing instructions stored in a memory circuit, as disclosed herein (cf., processing circuit 112, memory circuit 120, and communications module 118). Moreover, in some embodiments, method 300 may include collecting, receiving, and transmitting sensor data from either one of a force sensor, a capacitive sensor, an inertial sensor, or a facial sensor in the headset (e.g., sensors 121). In some embodiments, a method consistent with the present disclosure may include any one of the steps in method 300 performed in a different order, simultaneously, quasi-simultaneously, or overlapping in time.

Step 302 includes receiving a force data, a capacitive data, an inertial data, and a location data from a headset.

Step 304 includes correlating at least two of the force data, the capacitive data, and the inertial data to find a resonance event.

Step 306 includes identifying a user intention for the headset based on the resonance event.

Step 308 includes determining whether to accept or reject a button press action of the headset, based on the user intention.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

Hardware Overview

Figure 4:
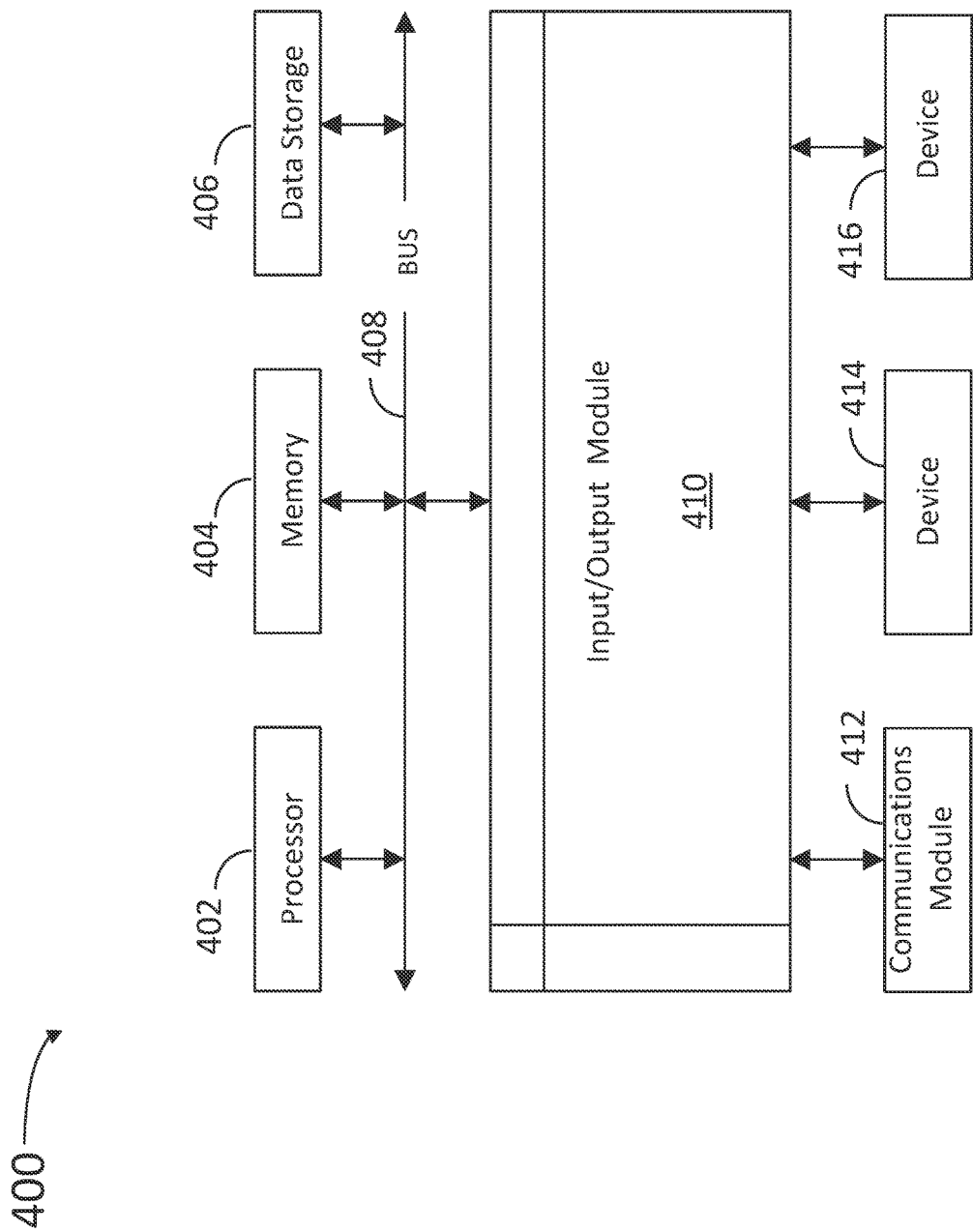
FIG. 4 is a block diagram of a system in the architecture of FIG. 1, configured to perform at least partially one or more of the steps in the method of FIGS. 2 and 3, according to some embodiments.

FIG. 4 is a block diagram illustrating a computer system for implementing a headset and methods for use thereof, according to some embodiments. In certain aspects, computer system 400 may be implemented using hardware or a combination of software and hardware, either in a dedicated server, or integrated into another entity, or distributed across multiple entities. Computer system 400 may include a desktop computer, a laptop computer, a tablet, a phablet, a smartphone, a feature phone, a server computer, or otherwise. A server computer may be located remotely in a data center or be stored locally.

Computer system 400 includes a bus 408 or other communication mechanism for communicating information, and a processor 402 (e.g., processor 112) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer-readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled with bus 408 for storing information and instructions. Computer system 400 may be coupled via input/output module 410 to various devices. Input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, input/output module 410 is configured to connect to a plurality of devices, such as an input device 414 and/or an output device 416. Exemplary input devices 414 include a keyboard and a pointing device, e.g., a mouse or a trackball, by which a consumer can provide input to the computer system 400. Other kinds of input devices 414 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 416 include display devices, such as an LCD (liquid crystal display) monitor, for displaying information to the consumer.

According to one aspect of the present disclosure, smart glass 100 can be implemented, at least partially, using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network.

The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires forming bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more embodiments, the computer-readable media is non-transitory computer-readable media, computer-readable storage media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon implementation preferences, it is understood that the specific order or hierarchy of blocks in the processes may be rearranged, or that not all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject technology is illustrated, for example, according to various aspects described above. The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that some or all steps, operations, or processes may be performed automatically, without the intervention of a user. Method claims may be provided to present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the included claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, and Brief Description of the Drawings of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the included subject matter requires more features than are expressly recited in any claim. Rather, as the claims reflect, inventive subject matter lies in less than all features of a single disclosed configuration or operation. The claims are hereby incorporated into the Detailed Description, with each claim standing on its own to represent separately patentable subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A computer-implemented method, comprising:
    receiving a force data from a force sensor in a headset, a capacitive data from a capacitive sensor in the headset, an inertial data from an inertial sensor in the headset, and a location data from a face sensor in the headset;
    combining one or more of the force data, the capacitive data, the inertial data, and the location data to assess a user intention; and
    determining whether to accept or reject a button press action on the headset based on the user intention, wherein the force data and the capacitive data are indicative of the button press action, and the inertial data is indicative of an involuntary collision of a user with an obstacle, and
    wherein combining the force data and the capacitive data comprises assessing that the user intention is not to perform the button press action.

2. The computer-implemented method of claim 1, wherein the headset is configured to run an immersive reality application hosted by a remote server, further comprising performing an action in the immersive reality application when the button press action is accepted.

3. The computer-implemented method of claim 1, wherein the headset is configured to run an immersive reality application hosted by a remote server, further comprising stopping the immersive reality application when the location data is indicative that the headset is not on a user's face.

4. The computer-implemented method of claim 1, wherein the headset is configured to run an immersive reality application hosted by a remote server, further comprising stopping the immersive reality application when the inertial data indicates a free-fall of the headset.

5. The computer-implemented method of claim 1, wherein the force sensor is a strain gage, further comprising identifying the force data as a passing finger or a hair touch, and discarding the force data to assess the user intention.

6. The computer-implemented method of claim 1, wherein the capacitive data is indicative of a presence of a user finger, and the force data is indicative of the button press action, and combining the force data and the capacitive data comprises assessing that the user intention is to perform the button press action.

7. The computer-implemented method of claim 1, wherein the inertial data is indicative of a movement of the headset consistent with the button press action, and the force data is indicative of the button press action, and combining the force data and the inertial data comprises assessing that the user intention is to perform the button press action.

8. The computer-implemented method of claim 1, wherein the face sensor is the capacitive sensor and the location data is indicative of a presence of the headset on a user face, and combining the force data and the capacitive data comprises assessing that the user intention is to perform the button press action.

9. The computer-implemented method of claim 1, wherein combining the force data and the location data comprises assessing that the user intention is not to perform the button press action when the location data is indicative that the headset is not in contact with a user's face.

10. A system, comprising:
one or more processors; and
a memory configured to store instructions which, when executed by the one or more processors, cause the system to:
receive a force data from a force sensor in a headset, a capacitive data from a capacitive sensor in the headset, an inertial data from an inertial sensor in the headset, and a location data from a face sensor in the headset;
combine one or more of the force data, the capacitive data, the inertial data, and the location data to assess a user intention; and
determine whether to accept or reject a button press action of the headset based on the user intention, wherein the force data and the capacitive data are indicative of the button press action, and the inertial data is indicative of an involuntary collision of a user with an obstacle, and
wherein combining the force data and the capacitive data comprises assessing that the user intention is not to perform the button press action.

11. The system of claim 10, wherein the headset is configured to run an immersive reality application hosted by a remote server, and to perform an action in the immersive reality application when the button press action is accepted.

12. The system of claim 10, wherein the headset is configured to run an immersive reality application hosted by a remote server, and to stop the immersive reality application when the location data is indicative that the headset is not on a user's face.

13. The system of claim 10, wherein the headset is configured to run an immersive reality application hosted by a remote server, and to stop the immersive reality application when the inertial data indicates a free-fall of the headset.

14. The system of claim 10, wherein the force sensor is a strain gage, and the one or more processors execute instructions to identify the force data as a passing finger or a hair touch, and discarding the force data to assess the user intention.

15. A computer-implemented method, comprising:
receiving a force data, a capacitive data, an inertial data, and a location data from a headset;
correlating at least two of the force data, the capacitive data, and the inertial data to find a resonance event;
identifying a user intention for the headset based on the resonance event; and
determining whether to accept or reject a button press action of the headset, based on the user intention, wherein the force data and the capacitive data are indicative of the button press action, and the inertial data is indicative of an involuntary collision of a user with an obstacle, and
wherein correlating at least two of the force data, the capacitive data, and the inertial data comprises assessing that the user intention is not to perform the button press action.

16. The computer-implemented method of claim 15, wherein the headset is configured to run an immersive reality application hosted by a remote server, further comprising performing an action in the immersive reality application when the button press action is accepted.

17. The computer-implemented method of claim 15, wherein the headset is configured to run an immersive reality application hosted by a remote server, further comprising stopping the immersive reality application when the location data is indicative that the headset is not on a user's face.

18. The computer-implemented method of claim 15, wherein the headset is configured to run an immersive reality application hosted by a remote server, further comprising stopping the immersive reality application when the inertial data indicates a free-fall of the headset.

* * * * *